United States Patent
Bhagwan et al.

(10) Patent No.: US 8,856,119 B2
(45) Date of Patent: Oct. 7, 2014

(54) HOLISTIC DISAMBIGUATION FOR ENTITY NAME SPOTTING

(75) Inventors: Varun Bhagwan, San Jose, CA (US); Tyrone W. A. Grandison, San Jose, CA (US); Daniel F. Gruhl, San Jose, CA (US); Jan H. Pieper, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 865 days.

(21) Appl. No.: 12/394,078

(22) Filed: Feb. 27, 2009

(65) Prior Publication Data

US 2010/0223292 A1    Sep. 2, 2010

(51) Int. Cl.
*G06F 17/30* (2006.01)
*G06F 7/00* (2006.01)
*G06F 17/27* (2006.01)

(52) U.S. Cl.
CPC .................................. *G06F 17/278* (2013.01)
USPC ........... 707/736; 707/738; 707/739; 707/758; 707/794; 707/798; 704/9; 706/55

(58) Field of Classification Search
None
See application file for complete search history.

(56) References Cited

U.S. PATENT DOCUMENTS

| | | | |
|---|---|---|---|
| 6,671,737 B1 * | 12/2003 | Snowdon et al. ............. | 709/243 |
| 6,711,585 B1 | 3/2004 | Copperman et al. | |
| 2002/0156551 A1 * | 10/2002 | Tackett et al. ................. | 700/245 |
| 2005/0160059 A1 | 7/2005 | Garrity et al. | |
| 2007/0106758 A1 * | 5/2007 | Chi et al. ....................... | 709/219 |
| 2007/0118357 A1 * | 5/2007 | Kasravi et al. .................. | 704/10 |
| 2007/0203720 A1 * | 8/2007 | Singh et al. ........................ | 705/1 |
| 2007/0233656 A1 | 10/2007 | Bunescu et al. | |
| 2008/0040352 A1 | 2/2008 | Ellis | |
| 2008/0065621 A1 | 3/2008 | Ellis | |
| 2008/0183695 A1 * | 7/2008 | Jadhav .............................. | 707/5 |
| 2008/0208864 A1 * | 8/2008 | Cucerzan et al. ................. | 707/8 |
| 2008/0270120 A1 * | 10/2008 | Pestian et al. ..................... | 704/9 |
| 2009/0144609 A1 * | 6/2009 | Liang et al. .................. | 715/230 |
| 2009/0171951 A1 * | 7/2009 | Lucas et al. ....................... | 707/5 |
| 2010/0145902 A1 * | 6/2010 | Boyan et al. .................... | 706/54 |
| 2011/0087670 A1 * | 4/2011 | Jorstad et al. ................. | 707/741 |

OTHER PUBLICATIONS

Sieg, Ahu et al. "Representing context in web search using ontological user profiles". 2007.*
Tsatsaronis, George et al. "Word Sense Disambiguation with Spreading Activation Networks Generated from Thesauri" Proceesing of the 20th International Joiint Conference on Articificial Intelligence (IJCAI 2007), pp. 1725-1730.*

* cited by examiner

*Primary Examiner* — Alicia Lewis
(74) *Attorney, Agent, or Firm* — Gibb & Riley, LLC

(57) ABSTRACT

A method resolves ambiguous spotted entity names in a data corpus by determining an activation level value for each of a plurality of nodes corresponding to a single ambiguous entity name. The activation levels for each of the nodes may be modified by inputting outside domain knowledge corresponding to the nodes to increase the activation value of the nodes, spotting entity names corresponding to the nodes to increase the activation value of the nodes, searching the data corpus to spot newly posted entity names to increase the activation value of the nodes, and searching the data corpus to reduce or deactivate the activation value of the nodes by eliminating false positives. The ambiguous entity name is assigned to the node determined to have the highest activation level and is then outputted to a user.

12 Claims, 5 Drawing Sheets

HOLISTIC DISAMBIGUATION FOR ENTITY NAME SPOTTING

BACKGROUND OF THE INVENTION

1. Field of the Invention

The general field of this invention relates to reducing ambiguity in entity name spotting by using additional information available through the context of a data subset.

2. Description of the Related Art

Entity Name Spotting is a term used in data mining and natural language processing that describes the process of finding names of objects of interest in the underlying data set. Examples include spotting names of geographic locations (cities, countries, etc), organizations (companies, etc) or people's names (politicians, CEOs, artists, etc).

Entity name spotting is a difficult problem in domains where ambiguity is common (or even embraced).

Typically, a sentence will have multiple, potentially overlapping entity names that need to be spotted. In these instances a decision must be made as to which entity name is the correct one. Most data-sets are comprised of individual data objects, and subsets of data objects are usually related to each other by structure, topic, or domain. For example, data-sets derived from internet discussion forums consist of individual user comments (the individual data objects), and all comments from a specific thread form a subset of related data objects. Moreover, all threads related to a specific topic or domain may form another subset of related data objects.

In the music domain, data objects may belong to a subset as specific as a band's MySpace page, to as broad as a UUNET discussion group on country music. These cases provide the overall context in which more focused entity name spotting can occur.

The entity name itself can be of multiple types. In the music domain, the entity name being spotted can include an individual artist, a band, an individual track, a record album, etc. Spotting for multiple types of entity names within discussions poses interesting challenges, such as spotting track/album/band names made up of typical stopwords or common words, (e.g., new, hello, yesterday etc.), determining which band/artist a track/album belongs to, (e.g., a cover of a popular track), etc.

The current state of the art focuses on named entity disambiguation by mapping entities in an input document against a predefined set of category tags, disambiguating names in web data by leveraging clustering algorithms and linguistically derived features to achieve disambiguation, entity (or name) disambiguation using ontologies for background information, and filtering unstructured content in a web-service database using query constraints at runtime, where the constraints include name spotting constraints.

SUMMARY OF THE INVENTION

In view of the foregoing and other exemplary problems, drawbacks, and disadvantages of the conventional methods and structures, the exemplary aspects of the present invention provide the reduction of ambiguity in entity names spotting by using additional information available through the context of a data subset.

An exemplary aspect of the present invention includes a computer implemented method for reducing ambiguities in entity names spotting, including performing an entity name spotting process in a data corpus and identifying, based on the entity name spotting process, an ambiguous entity name corresponding to at least two potentially matching categorical nodes of an activation network. The activation network comprises a plurality of predefined categorical nodes. The method determines an activation level for each of the potentially matching categorical nodes, and selects a most activated categorical node of the potentially matching categorical nodes, where the most activated categorical node has a highest activation level of each potentially matching categorical node. Thereafter, the method substitutes the entity name for the ambiguous entity input by the user to output to a user or another computer program based on the most activated categorical node having the highest activation level.

For each categorical node, determining the activation level includes receiving metadata related to entities in the data corpus to increase the activation level of the potentially matching categorical nodes, analyzing the metadata to determine related categorical nodes to increase the activation level of the potentially matching categorical nodes, analyzing semantic information of user comments to increase the activation level of the potentially matching categorical nodes, and analyzing an ontology customized for the activation network to increase the activation level of the potentially matching categorical nodes. Entities may include proper names, credentials, or identifications. Metadata may be from the data corpus or a subject matter expert data source. Augmentation of semantic information may include domain specific forums and domain specific blogs corresponding to the activation network. Analyzing the ontology may determine an acronym or a nickname of the categorical nodes.

In another exemplary aspect of the present invention, a computer implemented method for reducing ambiguities in entity spotting, includes creating one node for each entity of interest of a data corpus comprising a plurality of entities, wherein each of the nodes has an activation level value. Outside domain knowledge is input to change activation levels of the nodes, and a user forum is analyzed to spot entities. The activation levels on nodes are modified corresponding to entities spotted in the forum during the searching. Thereafter, the user forum is searched for newly posted entities, which additionally modifies the activation levels on nodes corresponding to the newly posted entities. The method then identifies ambiguous entities from the data corpus where the ambiguous entities each correspond to a plurality of potentially matching nodes. A most activated node is selected from the potentially matching nodes, where the most active node has the highest activation level, and the ambiguous entity is assigned to the most activated node. Once all ambiguous entities have been assigned, the data corpus is searched for next newly posted entities. Finally, the entity is output to a user based on the most active node having the highest activation level.

With these novel features, the present invention resolves ambiguous spotted entity names in a data corpus by determining an activation level value for each of a plurality of nodes corresponding to a single ambiguous entity name. The activation levels for each of the nodes may be modified by inputting outside domain knowledge corresponding to the nodes to increase the activation value of the nodes, spotting entity names corresponding to the nodes to increase the activation value of the nodes, searching the data corpus to spot newly posted entity names to increase the activation value of the nodes, and/or searching the data corpus to reduce or deactivate the activation value of the nodes by eliminating false positives. The ambiguous entity name is then assigned to the node which has the highest activation level.

BRIEF DESCRIPTION OF THE DRAWINGS

The embodiments of the invention will be better understood from the following detailed description with reference to the drawings, which are not necessarily drawing to scale and in which.

DETAILED DESCRIPTION OF EXEMPLARY EMBODIMENTS OF THE INVENTION

Figure 1:
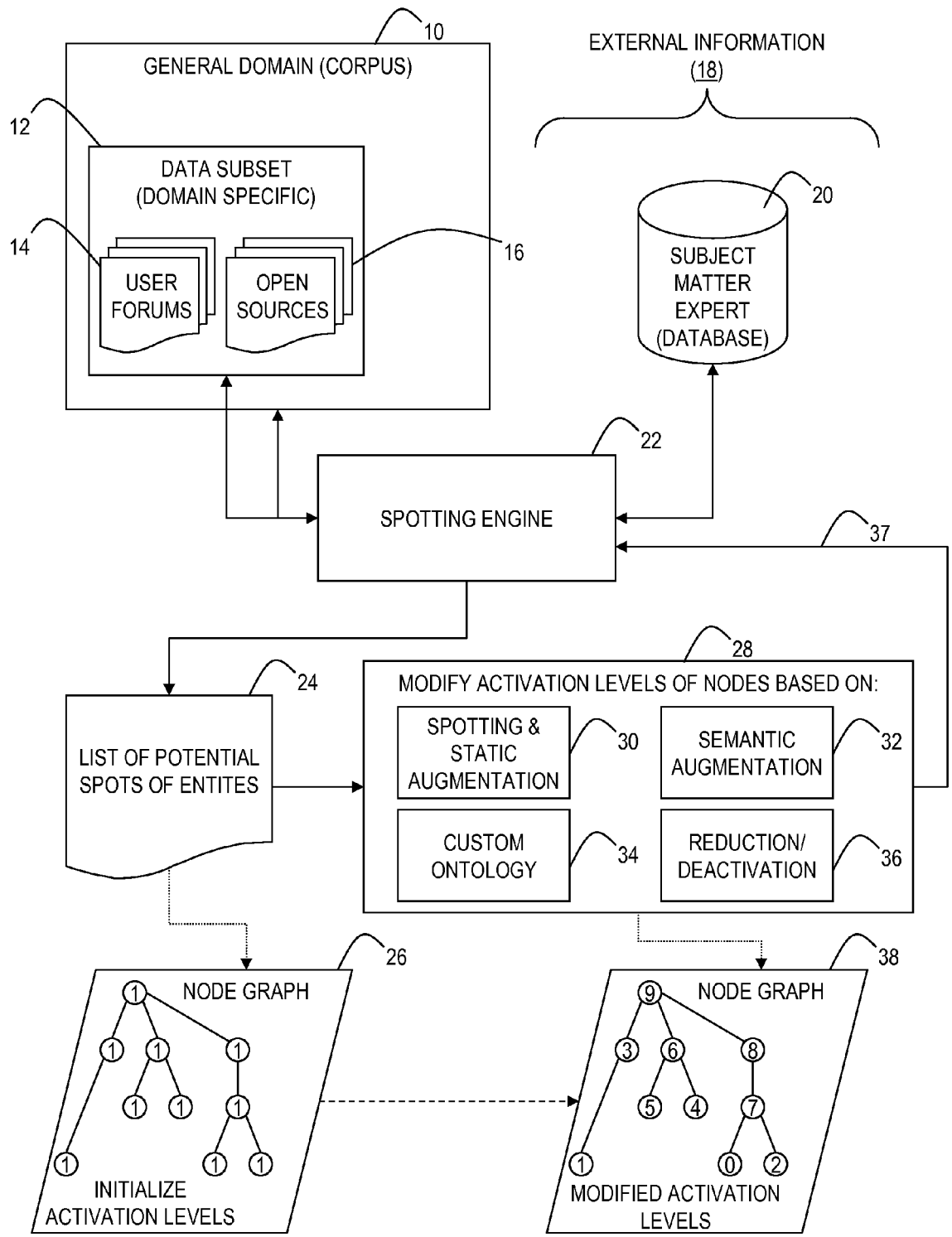
FIG. 1 is a schematic diagram of the present invention.

The embodiments of the invention and the various features and advantageous details thereof are explained more fully with reference to the non-limiting embodiments that are illustrated in the accompanying drawings and detailed in the following description.

The main idea of this invention is to reduce disambiguity in entity spotting by using additional information available through the context of the data subset. This can be done by first creating a list of potential spots over a sample of a corpus, and/or examining additional metadata provided either by the source (e.g., title, purpose of forum, etc) or by subject matter experts, thus restricting the membership of the set of potential entities which improves not only spotting accuracy, but also the performance of spotting engines For example, the word "Yesterday" is more likely to refer to a popular song if it occurs in the Beatles discussion group, than if it occurs in the general corpus. Similarly, if the majority of data objects refer to punk music, then a reference to "Ring of Fire" is more likely to refer to the cover version by the punk rock band "Social Distortion" than to the original song by Johnny Cash. The invention also deactivates invalid entities based on the domain context. For example, the Beatles song "Yesterday" should not be spotted in domains that are not related to the Beatles.

The invention looks at the corpus as a whole, at the topic domain subset, and external information sources to constrain entity spot choices. This invention may be used in a spreading activation network or any system that develops prior probabilities.

The present invention is exemplified in the music domain, but is applicable in many other domains. In the music domain, an activation network may consist of nodes representing artists, tracks, albums, band members, genres, etc. The data corpus is comprised of domain specific text gathered from a number of openly accessible sources on the internet, such as band pages, discussion groups, fan pages, etc. As the corpus, (or sub corpus, e.g., all the posts with a specific topic), is being processed, the activation levels for each of the nodes are modified accordingly. When an ambiguous spot emerges, the system considers the nodes for each spot possibility and then selects the most activated of them.

The process of modifying activation levels is multi-fold, and involves one or more of the following steps: 1) activation using static information derived from information sources, such as MusicBrainz; 2) semantic augmentation by analyzing user comments, including accounting for temporal events; 3) custom ontology to account for acronyms/nicknames of nodes, (artists, tracks, albums, bands, etc.); and/or, 4) reduction (or deactivation) by eliminating false positives using stopwords, and/or heuristics, etc.

Thus, activation may be done both with static information, (e.g., a band mentioned in a user forum increases activation on songs of that band), as well as semantically, (the statement, "I love your new release!" may activate bands who have recently released something), and combined with "news" sources to increase spot likelihood, (e.g., if an artist wins a Grammy, they are more likely to be mentioned). Nicknames of bands/albums/tracks and band members are an important tool here as well, (e.g., Amy Winehouse is often referred to as, "Amy Vodkahouse," "Amy Whiskyhouse," "Amy Beerhouse," etc.).

The present invention allows for customizing the activation level values depending on the dataset under consideration. As a result, within larger sub-corpora, trends such as common genres discussed can be activated, and those not mentioned are deactivated (e.g., the heavy metal music forum has little Country/Western music mentioned).

The system also accounts for "deactivation" of common terms to reduce false positives, (e.g., songs including "The" in the name are deactivated as the base corpus as this term appears often). Rules and clues for self titled albums/tracks, (e.g., "Pennywise") are based on semantic queues.

The present invention exploits those discussion forums during the data mining process that have a certain internal coherence toward a particular topic, more so than the total corpus that includes various topics. Thus, a discussion in a forum that has mentioned a lot of Emo music is more likely to be about Emo music than easy listening.

Additionally, well defined and authoritative ontologies, for example, MusicBrainz™ and FreeDB™, provide a rich and accurate ontology and fact base for a particular domain. Leveraging data in these specialized databases to assist in the disambiguation process is more useful than data from in other domains where such supporting information is less common.

Often language used in these corpuses, especially posts on discussion forums are poorly formed from a linguistic standpoint. This makes "statistical" matching of phrases more important than full parsing.

While there are many "frameworks" that the present invention may be used with, the following illustrates an approach via spreading activation network. The invention begins by creating one node for each entity name of interest. In this case, artist, song, album, genera, nickname, band membership, etc. Edges are established between these nodes that indicate the particular relationships between the nodes. For example, an edge from a song to the genera(s) of that song. Outside domain knowledge may increase activation on nodes, e.g. press activity on an artist. A domain specific forum, (i.e., sub-corpus) is traversed and as entity names are spotted, activation level values are increased for those nodes corresponding to the spotted entity names. Thus, the activation is spread through the graph of nodes.

As new posts are created in the forums, the nodes of the graph are re-traversed. As each post is parsed, additional transitive activation of the nodes, (the activation network is further modified such that modification may affect multiple related nodes), are based on salient characteristics. These characteristics are clear indicators of an activation requirement, e.g., an explicit mention of an artist, or if a phrase like "new album" is mentioned, then the activation levels of all nodes of albums that have been recently released are modified.

When an ambiguous post is spotted, i.e., when multiple nodes are possible matches (e.g. "Amy" could be "Amy Winehouse" or "Amy Grant"), the invention selects the node that has the highest activation value. Once all ambiguous spots have been assigned, the transient activation modification is terminated and the spotting moves onto the next post.

Referring again to the drawings, FIG. 1 is a schematic diagram of the present invention that illustrates a general domain, or corpus 10, that includes a domain specific data subset 12. The data subset 12 may include user forums 14 and/or user blogs, (web logs), and open source textual information 16, both data sources being domains specific with respect to a particular topic of data. External information 18 apart from the general domain 10 and information within the general domain 10 and the more specific data subset 12 is processed by the spotting engine 22 to identify all entity names contained therein. From the identified entity names, a list of potential spots of entity names 24 is created and a node graph 26 with unique nodes corresponding to each unique spotted entity name. Nodes edges are created between nodes to identify relationships between nodes. All nodes are initialized with an activation value, (as shown as "1" in the initial node graph 26). Thereafter, the present invention modifies 28 the activation values of the nodes based on spotting and static augmentation 30, semantic augmentation 32, custom ontology 34 and/or reduction of an activation value or deactivation of the corresponding node 36.

Feedback loop 37 communicates between the modifying portion 28 of the activation network and the spotting engine 22, such that entities that are determined to be invalid based on the domain context, (for example, the Beatles song, "Yesterday" spotted in a domain/forum that is not related to the Beatles group), are deactivated and not considered by the spotting engine 22.

Node graph 38 illustrates a representative node graph 38 illustrating nodes having activation values of 0-9, for example. The modified activation levels are reported back to the spotting engine via feedback loop 37 to adjust the set of potential entities that the spotting engine tries to identify. For example, if 28 deactivates a certain entity, then the spotting engine 22 should stop spotting the deactivated entity based on the feedback loop 37, as described above.

Figure 2:
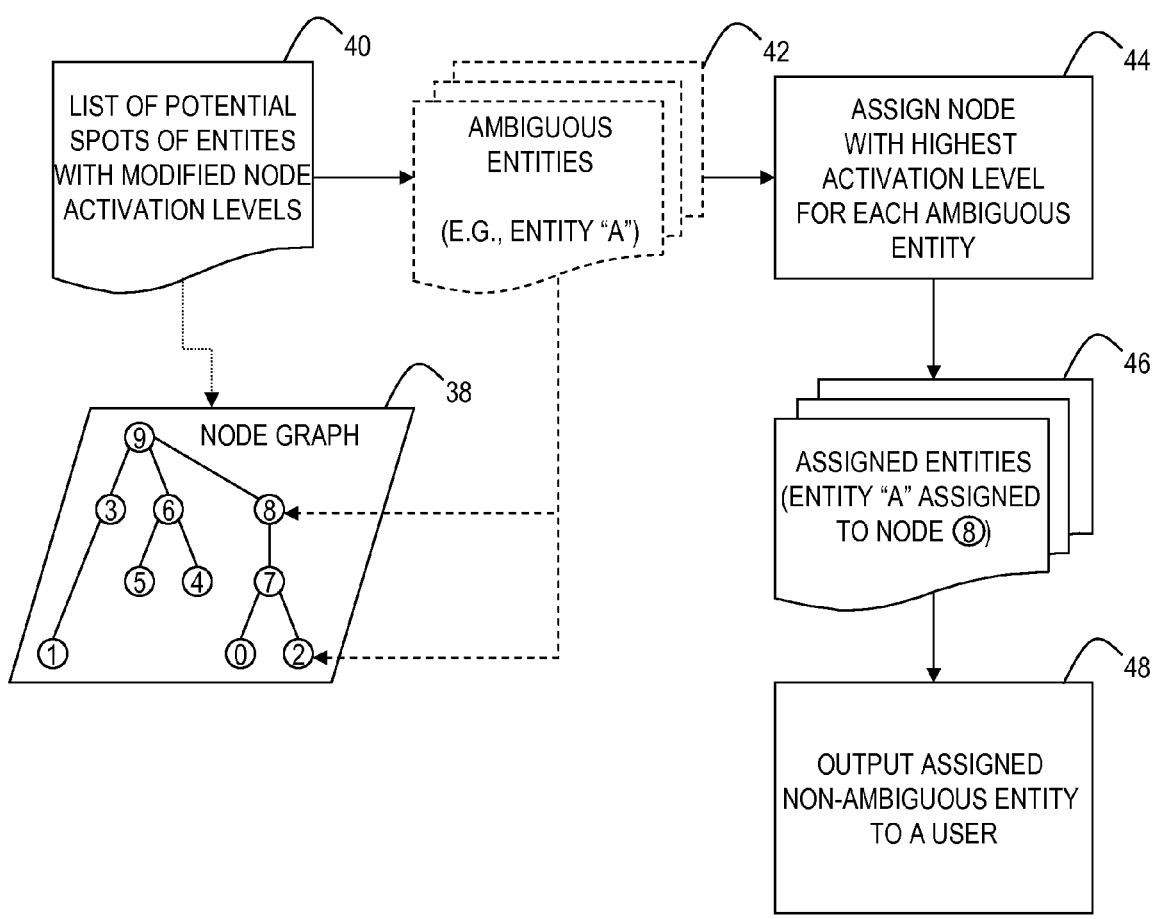
FIG. 2 is a schematic diagram of the present invention according to FIG. 1.

FIG. 2 is a schematic diagram of the present invention according to FIG. 1, where a list of potential spots of entity names 40 corresponds to the node graph 38 including the activation values of 0-9. Ambiguous entity names, (e.g., "A"), are identified 42 that correspond to at least two of the nodes of the graph, (in this illustration, "Entity A" corresponds to nodes with activation levels "8" and "2"). The present invention determines which of the nodes that a single entity name corresponds to have the highest activation value 44. In this example, the node having an activation level of "8" has the highest activation value of the nodes corresponding to "Entity A." Therefore, "Entity A" is assigned 46 to the node having an activation level "8", and the relationship between "Entity A" and the node having an activation level "2" is terminated from consideration. Finally, the newly assigned non-ambiguous entity name may be output to a user 48 by user output device mentioned in more detail below.

Figure 3A:
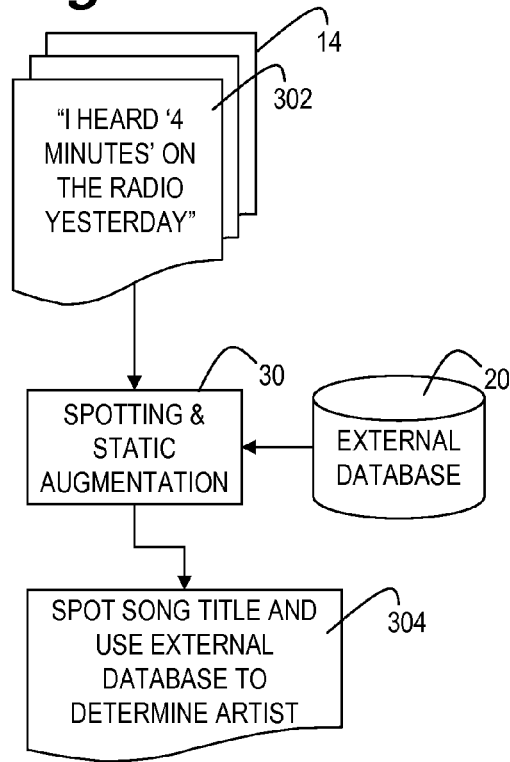
FIG. 3A is a schematic diagram of one method of modifying an activation level of the present invention.

FIG. 3A is a schematic diagram of one method of modifying an activation level 28 of the present invention of FIG. 1, with respect to spotting and static augmentation 30. Here, the invention processes a domain specific data subset 12, for example a user forum 14 having a user comment 302, "I HEARD '4 MINUTES' ON THE RADIO YESTERDAY." The spotting engine 22 spots the entity name, "4 MINUTES" and retrieves relevant information from the external database 20 to determine which artist the song title refers to 304. The program also may identify the date of entry of the user comment and associate the spotted entity name "YESTERDAY" to give an increased activation level to any song entitled "4 MINUTES" that was released closest to the date of the user comment, thus either eliminating or reducing in activation weight any song of similar title that would have been released much earlier in time. Therefore, the instance of spotting and identifying the entity name "4 MINUTES," increases the activation level of a node assigned to that artist's particular song.

Figure 3B:
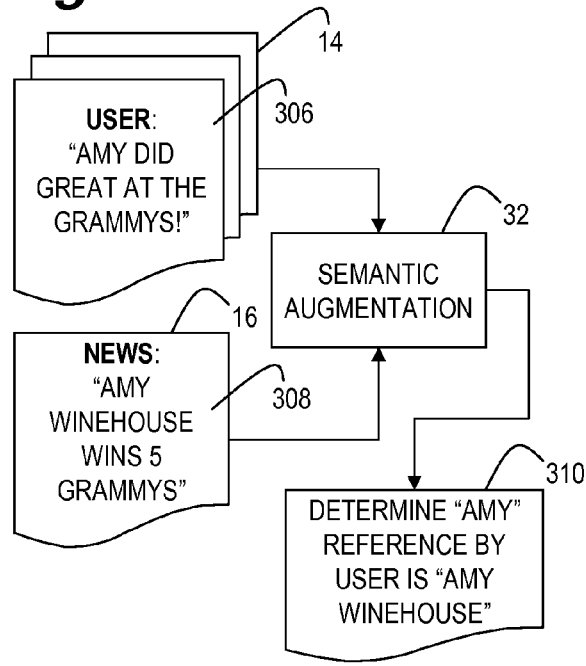
FIG. 3B is a schematic diagram of another method of modifying an activation level of the present invention.

FIG. 3B is a schematic diagram of another method of modifying an activation level 28 of the present invention of FIG. 1, with respect to semantic augmentation 32. Here, the invention processes a domain specific data subset 12, for example, a user forum 14 having a user comment 306, "AMY DID GREAT AT THE GRAMMYS!" and an open source 16, for example, a news source 16 having a release 308 stating, "AMY WINEHOUSE WINS 5 GRAMMYS." The invention by semantic augmentation 32 determines 310 that the reference to "AMY" in the user comment 306 refers to "AMY WINEHOUSE" by the comparison of the news release 308 to the user comment 306. The process may also be augmented by the comparison of the dates of both data sources to determine an increased likelihood of relevance as the dates of each spotted entity name are determined to be more coincident with each other. Therefore, the instance of spotting and identifying the entity name "AMY," increases the activation level of a node assigned to that artist's particular name.

Figure 3C:
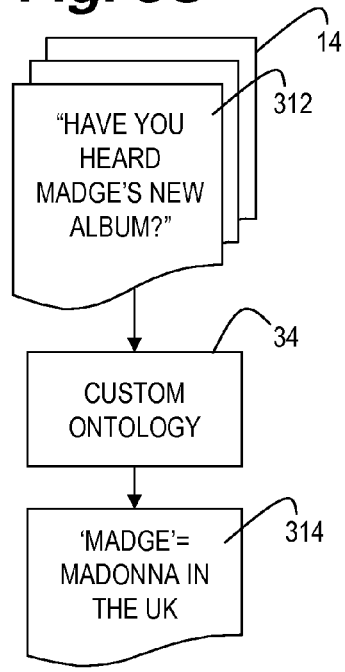
FIG. 3C is a schematic diagram of another method of modifying an activation level of the present invention.

FIG. 3C is a schematic diagram of another method of modifying an activation level 28 of the present invention of FIG. 1, with respect to custom ontology 34. Here, the invention processes a domain specific data subset 12, for example, a user forum 14 having a user comment 312, "HAVE YOU HEARD MADGE'S NEW ALBUM?" The invention by a process of a customized ontology recognizes the spotted entity name, "MADGE" as being associated with the artist Madonna's nickname in the UK, 314. Therefore, nicknames, acronyms, slang or non-standard language and other similar equivalent words may be associated with other words previously defined as nodes in the graph. Therefore, the instance of spotting and identifying the entity name "MADGE," increases the activation level of a node assigned to that artist's particular name and/or nickname.

Figure 3D:
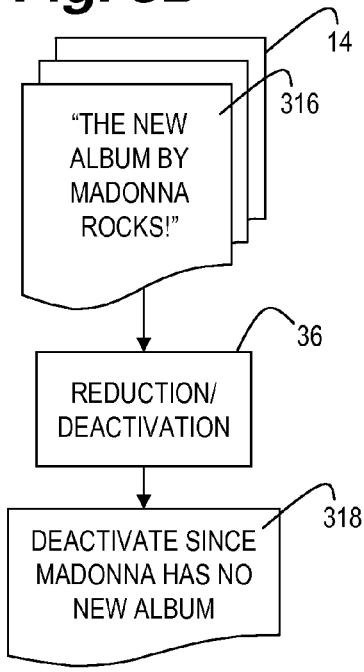
FIG. 3D is a schematic diagram of another method of modifying an activation level of the present invention.

FIG. 3D is a schematic diagram of another method of modifying an activation level 28 of the present invention of FIG. 1, with respect to reduction of an activation level or the complete deactivation of a node with respect to a spotted entity name. Here, the invention processes a domain specific data subset 12, for example, a user forum 14 having a user comment 316, "THE NEW ALBUM BY MADONNA ROCKS!" The invention however determines that the particular artist "MADONNA" has not had a "NEW ALBUM" within a predetermined time frame related to the date of the user comment 316 in the user forum 14. Thus, the invention would deactivate the comment by not considering it with respect to modifying an activation level for a particular node in the graph, in this instance "MADONNA." Additionally, the invention may reduce an activation level of a node or deactivate a node altogether based on spotted entity names that are determined to not cause an increase in a particular node's activation level.

Figure 4:
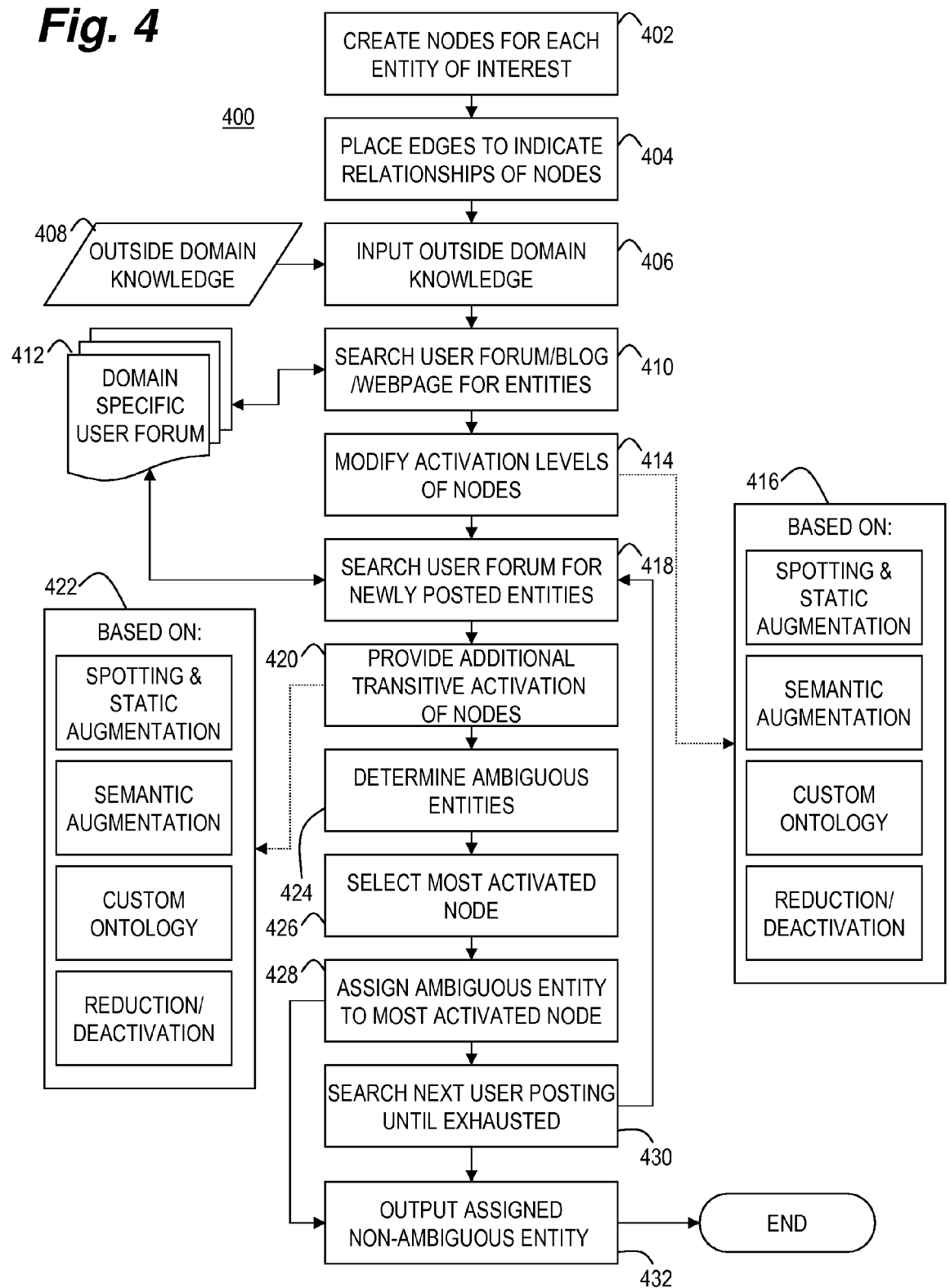
FIG. 4 is a logic flow chart diagram of the present invention.

FIG. 4 is a logic flow chart diagram 400 of the present invention that creates nodes for each entity name of interest 402 when the spotting engine 22 traverses the data in general domain 10 any the data subset 12. Edges are placed to indicate relationships between nodes 404. Knowledge data outside of the domain 408, (see also reference numbers 18 and 20 from FIG. 1), is then input 406 to further supplement information regarding the nodes. User domain specific 412 forums, blogs and/or web pages are searched by the spotting engine 22 for spotting entity names 410 to relate to activation information on each of the nodes. The activation values of the respective nodes are updated 414 based on entity names spotted by the spotting engine in the previous step 410. Modification of the nodes activation levels are based on the previously described spotting and static augmentation, semantic augmentation, customized ontology and reduction/deactivation as indicated by reference number 416.

The spotting engine 22 then continues to traverse the domain specific forum 412 to search for any newly posted entries in the forum, blog or web page 418. From these newly spotted entries, additional transitive information further modifies the activation levels of respective nodes 420 on the previously described spotting and static augmentation, semantic augmentation, customized ontology and reduction/deactivation as indicated by reference number 422, similar to reference number 416. At this point, and at any point where new entries based on new spotted entity names occur, the invention determines if any entity names are deemed ambiguous 424 where a single entity name is mapped to more than one node in the graph. The invention then determines which of these multiply mapped nodes have the highest activation level 426 and then assigns the ambiguous entity name to the determined node with the highest activation level 428.

In one embodiment of the invention, the spotting engine continues to search the domain specific data source 412 until all the postings have been searched or exhausted 430. Else, the assigned non-ambiguous entity name may be output 432 in substitution for a user's original ambiguous data after its initial assignment to the node with the highest activation level 428, or after all new postings have been searched 430. This substitution may occur while the user is typing text and text automatically is substituted to assist the user in typing. Additionally, the user may be presented with an option to either accept or reject text prepared for substitution by the invention. The substitution may also occur after text has already been entered into a user forum or blog to clean up ambiguous entries without any user interaction.

Figure 5:
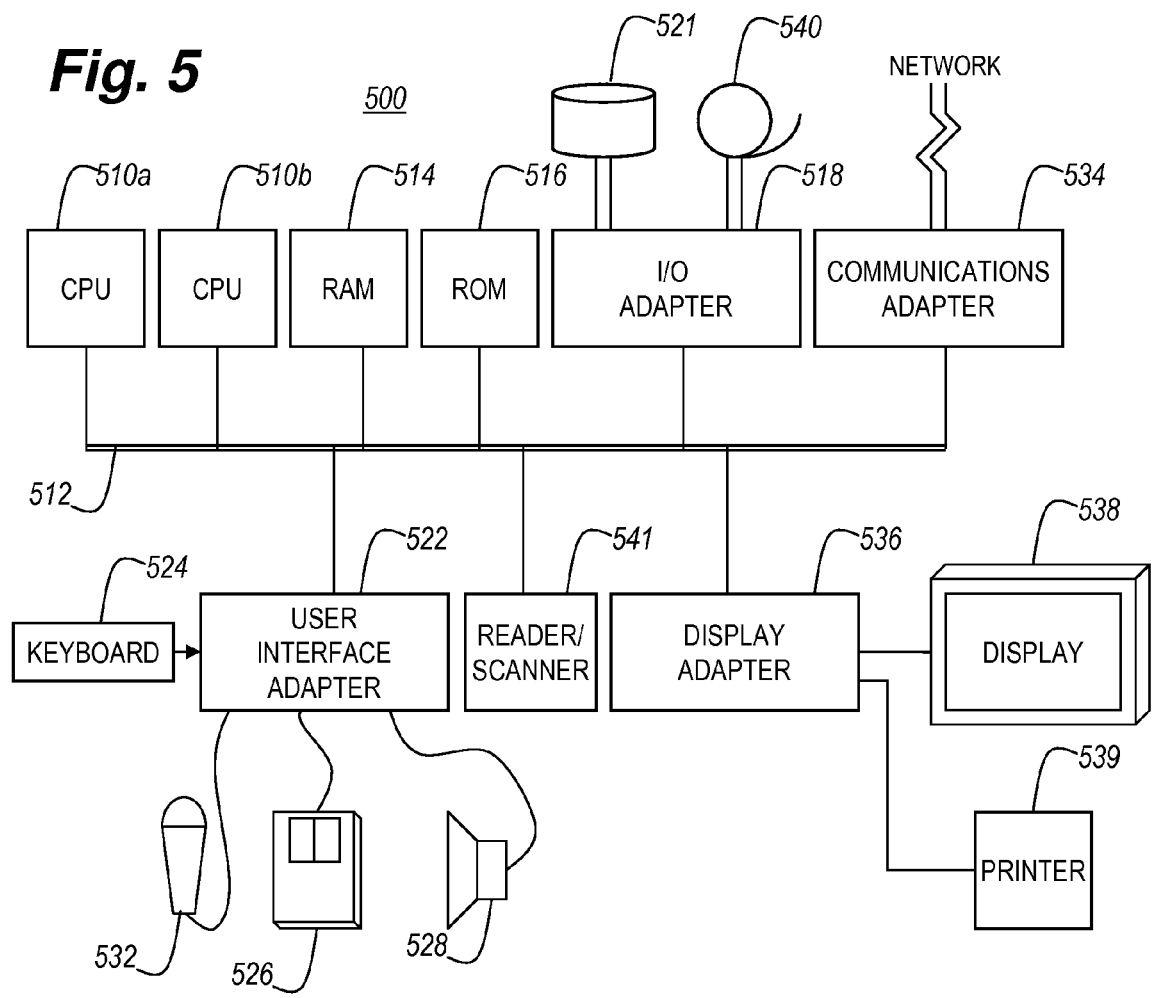
FIG. 5 a schematic diagram illustrating an exemplary hardware environment that may be used to implement the embodiments of the invention.

FIG. 5 is a schematic diagram illustrating an exemplary hardware environment that may be used to implement the embodiments of the invention. The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to FIG. 5, system 500 illustrates a typical hardware configuration which may be used for implementing the inventive system and method. The configuration has preferably at least one processor or central processing unit (CPU) 510a, 510b. The CPUs 510a, 510b are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, and Intranet, a personal area network (PAN), etc., and a display adapter 536 for connecting the bus 512 to a display device 538 and/or printer 539. Further, an automated reader/scanner 541 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 510 to execute a sequence of machine-readable instructions. These instructions may reside in various types of signal bearing media.

Thus, this aspect of the present invention is directed to a programmed product, comprising signal-bearing media tangibly embodying a program of machine-readable instructions executable by a digital data processor incorporating the CPU 510 and hardware above, to perform the method of the invention.

Figure 6:
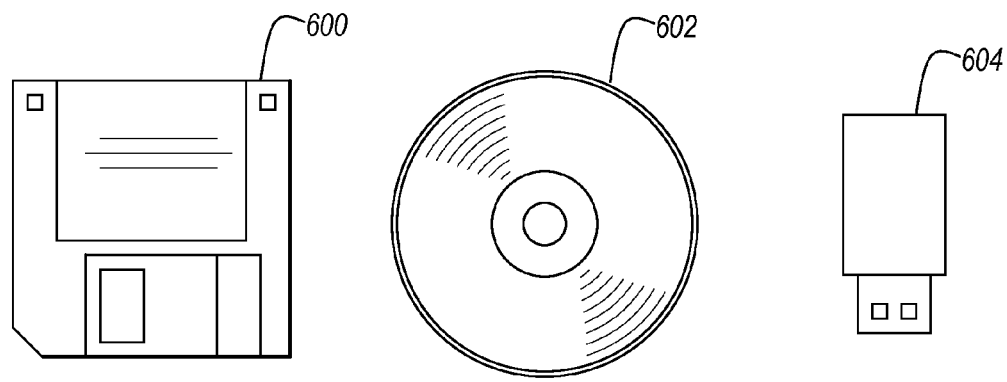
FIG. 6 is representative illustrations of computer-readable medium for carrying out the present invention.

This signal-bearing media may include, for example, a RAM contained within the CPU 510, as represented by the fast-access storage for example. Alternatively, the instructions may be contained in another signal-bearing media, such as a magnetic data storage diskette 600, CD-ROM 602 or "plug-and-play" memory device 604, like a USB flash drive, (FIG. 6), directly or indirectly accessible by the CPU 510.

Whether contained in the computer server/CPU 510, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as "C," etc.

In one embodiment of the invention, a computer implemented method reduces ambiguities in entity name spotting, by performing an entity name spotting process in a data corpus, by identifying, based on the entity name spotting process, an ambiguous entity name. The ambiguous entity name comprises an entity name corresponding to at least two potentially matching categorical nodes of an activation network, where the activation network comprises a plurality of predefined categorical nodes. An activation level is determined for each of the potentially matching categorical nodes, and the most activated categorical node of the potentially matching categorical nodes is selected. The most activated categorical node has a highest activation level of each potentially matching categorical node. The entity name is substituted for a user's ambiguous entry and is output to a user based on the most activated categorical node having the highest activation level. This substitution may occur while the user is typing text and text automatically is substituted to assist the user in typing. Additionally, the user may be presented with an option to either accept or rejection text prepared for substitution by the invention. The substitution may also occur after text has already been entered into a user forum or blog to clean up ambiguous entries without any user interaction.

Each categorical node includes a determined activation level determined by receiving metadata related to entity names in the data corpus to increase the activation level of the potentially matching categorical nodes. The metadata is analyzed to determine related categorical nodes to increase the activation level of the potentially matching categorical nodes. Likewise, any semantic information of user comments is analyzed to increase the activation level of the potentially matching categorical nodes. Furthermore, an ontology customized for the activation network is analyzed to increase the activation level of the potentially matching categorical nodes. Entity names may comprise proper names, nicknames, credentials, identification works, etc. Metadata may be from one of the data corpus or a subject matter expert data source external to the data corpus. The augmentation semantic information may comprise a domain specific forum or a domain specific blog corresponding to an activation network. Additionally, analyzing ontology of spotted entity names may determine an acronym or a nickname associated with particular categorical nodes.

In another embodiment of the invention, a computer implemented method that reduces ambiguities in entity name spotting creates one node for each entity name of interest of a data corpus comprising a plurality of entity names. Each of the nodes has an activation level. Outside domain knowledge is input to change activation levels of the nodes, and a user forum is searched to spot entity names. The activation levels on nodes corresponding to entity names spotted in the forum during the searching are modified, and the user forum is further searched for newly posted entity names. Modification of activation levels on nodes is performed corresponding to the newly posted entity names, and ambiguous entity names are identified from the data corpus, where ambiguous entity names correspond to a plurality of potentially matching nodes. Resolution of the ambiguous entity names occurs when a most activated node is identified from the potentially matching nodes, where the most active node has a highest activation level. The ambiguous entity name is then assigned to that most activated node, and once all ambiguous entity names have been assigned, the process continues searching the data corpus for any newly posted entity names. The entity name is substituted for a user's ambiguous entry and is output to a user based on the most activated categorical node having the highest activation level. This substitution may occur while the user is typing text and text automatically is substituted to assist the user in typing. Additionally, the user may be presented with an option to either accept or rejection text prepared for substitution by the invention. The substitution may also occur after text has already been entered into a user forum or blog to clean up ambiguous entries without any user interaction.

The input outside domain knowledge may comprise a subject matter expert data source that is external to the data corpus and the domain specific data sources. Modifying the activation level may involve utilizing semantic information comprising a domain specific forum or a domain specific blog. Modifying the activation level may also utilize ontology to determine an acronym or a nickname corresponding to the spotted entity name. Additionally, modifying of the activation level may comprise the reduction or deactivation of the activation level by eliminating false positives utilizing at least one of stopwords and heuristics with respect the spotted entity names.

In another embodiment of the invention, a computer implemented method reduces entity name spotting ambiguities in an activation network comprising a plurality of nodes representing predefined categories of items of interest within a domain. Each of the nodes comprise an activation level. The method includes gathering domain specific text from a plurality of wide area network accessible sources to provide a data corpus, where the data corpus comprises a plurality of entity names. The data corpus is searched to spot entity names, where entity names correspond to at least one node of the plurality of nodes. The activation level of the nodes is modified based on entity names spotted during the searching, and any ambiguous entity names are identified, where an ambiguous entity name corresponds to an entity name having a plurality of potentially matching nodes. A most activated node is selected of the potentially matching nodes, where the most activated node has a highest activation level of each potentially matching node. The entity name is substituted for a user's ambiguous entry and is output to a user based on the most activated categorical node having the highest activation level. This substitution may occur while the user is typing text and text automatically is substituted to assist the user in typing. Additionally, the user may be presented with an option to either accept or rejection text prepared for substitution by the invention. The substitution may also occur after text has already been entered into a user forum or blog to clean up ambiguous entries without any user interaction.

The activation level is modified by retrieving static information derived from information sources corresponding to the spotted entity name, by semantically analyzing domain specific user comments corresponding to the spotted entity name, by ontologically analyzing the entity names for one of acronyms and nicknames, and either reducing or deactivating the activation level by eliminating false positives using at least one of stopwords and heuristics.

Another embodiment of the invention includes a computer implemented method for reducing ambiguities in entity name spotting within an activation network, that creates one node for each entity name of interest of a data corpus comprising a plurality of entity names, where each of the nodes has an activation level. Values of the activation level of the nodes are modified by inputting outside domain knowledge corresponding to the nodes to increase the activation value of the nodes, searching the data corpus to spot entity names corresponding to the nodes to increase the activation value of the nodes, searching the data corpus to spot newly posted entity names to increase the activation value of the nodes, and searching the data corpus to reduce or deactivate the activation value of the nodes by eliminating false positives. Ambiguous entity names are identified from the data corpus, where ambiguous entity names each correspond to a plurality of potentially matching nodes. The ambiguous entity name is assigned to the most activated node and the entity name is output to a user based on the most active node.

With these novel features, the present invention resolves ambiguous spotted entity names, in a data corpus by determining an activation level value for each of a plurality of nodes corresponding to a single ambiguous entity name. The activation levels for each of the nodes may be modified by inputting outside domain knowledge corresponding to the nodes to increase the activation value of the nodes, spotting entity names corresponding to the nodes to increase the activation value of the nodes, searching the data corpus to spot newly posted entity names to increase the activation value of the nodes, and/or searching the data corpus to reduce or deactivate the activation value of the nodes by eliminating false positives. The ambiguous entity name is then assigned to the node which has the highest activation level.

It should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. Well-known components and processing techniques are omitted in the above-description so as to not unnecessarily obscure the embodiments of the invention.

Finally, it should also be understood that the terminology used in the above-description is for the purpose of describing particular embodiments only and is not intended to be limiting of the invention. For example, as used herein, the singular forms "a", "an" and "the" are intended to include the plural forms as well, unless the context clearly indicates otherwise. Furthermore, as used herein, the terms "comprises", "comprising," and/or "incorporating" when used in this specification, specify the presence of stated features, integers, steps, operations, elements, and/or components, but do not preclude the presence or addition of one or more other features, integers, steps, operations, elements, components, and/or groups thereof.

What is claimed is:

1. A computer implemented method for reducing ambiguities in entity name spotting, comprising:

performing an entity name spotting process in a data corpus;

identifying, based on said entity name spotting process, an ambiguous entity name, said ambiguous entity name comprising an entity name corresponding to at least two categorical nodes in a predefined domain of an activation network, said activation network comprising a plurality of predefined categorical nodes, each predefined categorical node having an initial activation level, and each said predefined categorical node having edges established between said predefined categorical nodes, said edges indicating a relationship between said predefined categorical nodes, said relationship between said predefined categorical nodes defining a direction of influence between said predefined categorical nodes, said predefined domain representing at least one predefined category of items of interest within said data corpus;

determining an updated activation level for each of said categorical nodes in said predefined domain, said updated activation level for each said predefined categorical node in said activation network being based on every edge between said predefined categorical nodes, each said updated activation level for each said predefined categorical node in said activation network being updated based on said relationship between said predefined categorical nodes, said updated activation level being based at least on information in said data corpus and context of said information, wherein for each categorical node, said determining said updated activation level comprising:

receiving metadata related to entity names in said data corpus to modify said activation level of said categorical nodes in said predefined domain;

analyzing said metadata to determine related categorical nodes to modify said activation level of said categorical nodes in said predefined domain;

analyzing semantic information of user comments to modify said activation level of said categorical nodes in said predefined domain; and analyzing an ontology customized for said activation network to modify said activation level of said categorical nodes in said predefined domain, said entity names comprising one of proper names, credentials and identifications;

selecting a most activated categorical node of said categorical nodes in said predefined domain, said most activated categorical node having a highest updated activation level of each categorical node;

assigning said ambiguous entity name to said most activated categorical node; and outputting said most activated categorical node to a user to replace said ambiguous entity name.

2. The method of claim 1, said metadata being from one of said data corpus and a subject matter expert data source.

3. The method of claim 1, said semantic information comprising one of a domain specific forum and a domain specific blog corresponding to said activation network.

4. The method of claim 1, said analyzing of said ontology comprising determining at least one of an acronym and a nickname of said categorical nodes.

5. A computer implemented method for reducing ambiguities in entity name spotting, comprising:
creating one node for each entity name of interest of a data corpus comprising a plurality of entity names to create nodes in an activation network, each of said nodes having an entity name and an initial activation level;
establishing edges between said nodes, said edges indicating a relationship between said nodes, said relationship between said nodes defining a direction of influence between said nodes;
determining an updated activation level for each of said nodes, said updated activation level being based at least on information in said data corpus;
inputting outside domain knowledge to change said updated activation level of said nodes;
searching a user forum to spot existing entity names;
modifying said updated activation level on nodes corresponding to said existing entity names spotted in said user forum during said searching by utilizing semantic information comprising one of a domain specific forum and a domain specific blog, said updated activation level for each node in said activation network being modified based on said relationship between said nodes and context of said information;
searching said user forum for newly posted entity names;
modifying said updated activation level on nodes corresponding to said newly posted entity names by utilizing semantic information comprising one of a domain specific forum and a domain specific blog;
identifying an ambiguous entity name from said data corpus, said ambiguous entity name corresponding to a plurality of potentially matching nodes;
selecting a most activated node from said plurality of potentially matching nodes, said most activated node having a highest updated activation level;
assigning said ambiguous entity name to said most activated node;
once all ambiguous entity names have been assigned, searching said data corpus for a next newly posted entity name; and
outputting said most activated node to a user to replace said ambiguous entity name,
each of said plurality of entity names comprising one of proper names, credentials and identifications.

6. The method of claim 5, said outside domain knowledge comprising a subject matter expert data source.

7. The method of claim 5, said modifying said updated activation level on nodes corresponding to said existing entity names and said modifying said updated activation level on nodes corresponding to said newly posted entity names utilizing ontology to determine at least one of an acronym and a nickname corresponding to said entity name.

8. The method of claim 5, said modifying said updated activation level on nodes corresponding to said existing entity names and said modifying said updated activation level on nodes corresponding to said newly posted entity names comprising one of reduction and deactivation of said updated activation level by eliminating false positives utilizing at least one of stopwords and heuristics.

9. A computer implemented method for reducing entity name spotting ambiguities in an activation network, said method comprising:
providing an activation network comprising nodes representing predefined categories of items of interest within a domain, edges being established between said nodes, said edges indicating a relationship between said nodes, said relationship between said nodes defining a direction of influence between said nodes based on sources of information, each of said nodes comprising an initial activation level;
determining an updated activation level for each of said nodes based at least on information in said domain, and each said updated activation level for each said node in said activation network being updated based on said relationship between said nodes and context of said information;
gathering domain specific text from a plurality of wide area network accessible sources to provide a data corpus comprising a plurality of entity names;
searching said data corpus to spot known entity names corresponding to at least one node;
modifying said updated activation level of said nodes based on said known entity names spotted during said searching, said modifying comprising one of reduction and deactivation of said updated activation level by eliminating false positives using one of stop words and heuristics;
identifying an ambiguous entity name corresponding to potentially matching nodes;
selecting a most activated node of said potentially matching nodes, said most activated node having a highest updated activation level of each potentially matching node;
assigning said ambiguous entity name to said most activated node; and
outputting said most activated node to a user to replace said ambiguous entity name,
each of said plurality of entity names comprising one of proper names, credentials and identifications.

10. The method of claim 9, said modifying said updated activation level comprising retrieving static information derived from information sources corresponding to said known entity names spotted during said searching.

11. The method of claim 9, said modifying said updated activation level on nodes corresponding to said known entity names comprising semantically analyzing domain specific user comments corresponding to said known entity names.

12. The method of claim 9, said modifying said updated activation level on nodes corresponding to said known entity names comprising ontologically analyzing said known entity names for one of acronyms and nicknames.

* * * * *